United States Patent [19]

Newton et al.

[11] Patent Number: 4,997,617

[45] Date of Patent: Mar. 5, 1991

[54] REAL-TIME REACTOR COOLANT SYSTEM PRESSURE/TEMPERATURE LIMIT SYSTEM

[75] Inventors: Dennis G. Newton; Richard R. Schemmel; Walter E. Van Scooter, Jr., all of Lynchburg, Va.

[73] Assignee: The Babcock & Wilcox Company, New Orleans, La.

[21] Appl. No.: 276,823

[22] Filed: Nov. 28, 1988

[51] Int. Cl.⁵ .............................................. G21C 7/36
[52] U.S. Cl. .................................. 376/216; 376/247; 364/579; 364/148
[58] Field of Search ............... 376/216, 245, 247, 246; 364/557, 558, 492, 579, 148, 152, 164

[56] References Cited

U.S. PATENT DOCUMENTS

| H, 289 | 6/1987 | Beltracchi | 364/492 |
|---|---|---|---|
| 4,318,778 | 3/1982 | Musick | 376/216 |
| 4,330,367 | 5/1982 | Musick | 376/245 |
| 4,552,718 | 11/1985 | Impink | 376/216 |
| 4,675,147 | 6/1987 | Schaefer | 376/245 |
| 4,801,421 | 1/1989 | Ackerson | 376/249 |

Primary Examiner—Donald P. Walsh
Attorney, Agent, or Firm—Vytas R. Matas; Robert J. Edwards; Eric Marich

[57] ABSTRACT

A nuclear reactor coolant system pressure/temperature system based on real-time data is disclosed. An input subsystem receives and performs initial processing of real-time plant analog and digital signals, and transmits same to a processing subsystem which develops real-time, nuclear reactor coolant system pressure/temperature limits. The real-time, pressure/temperature information is transmitted to an output subsystem for display purposes, for recording operating results, and for control and/or protection system setpoint generation.

13 Claims, 1 Drawing Sheet

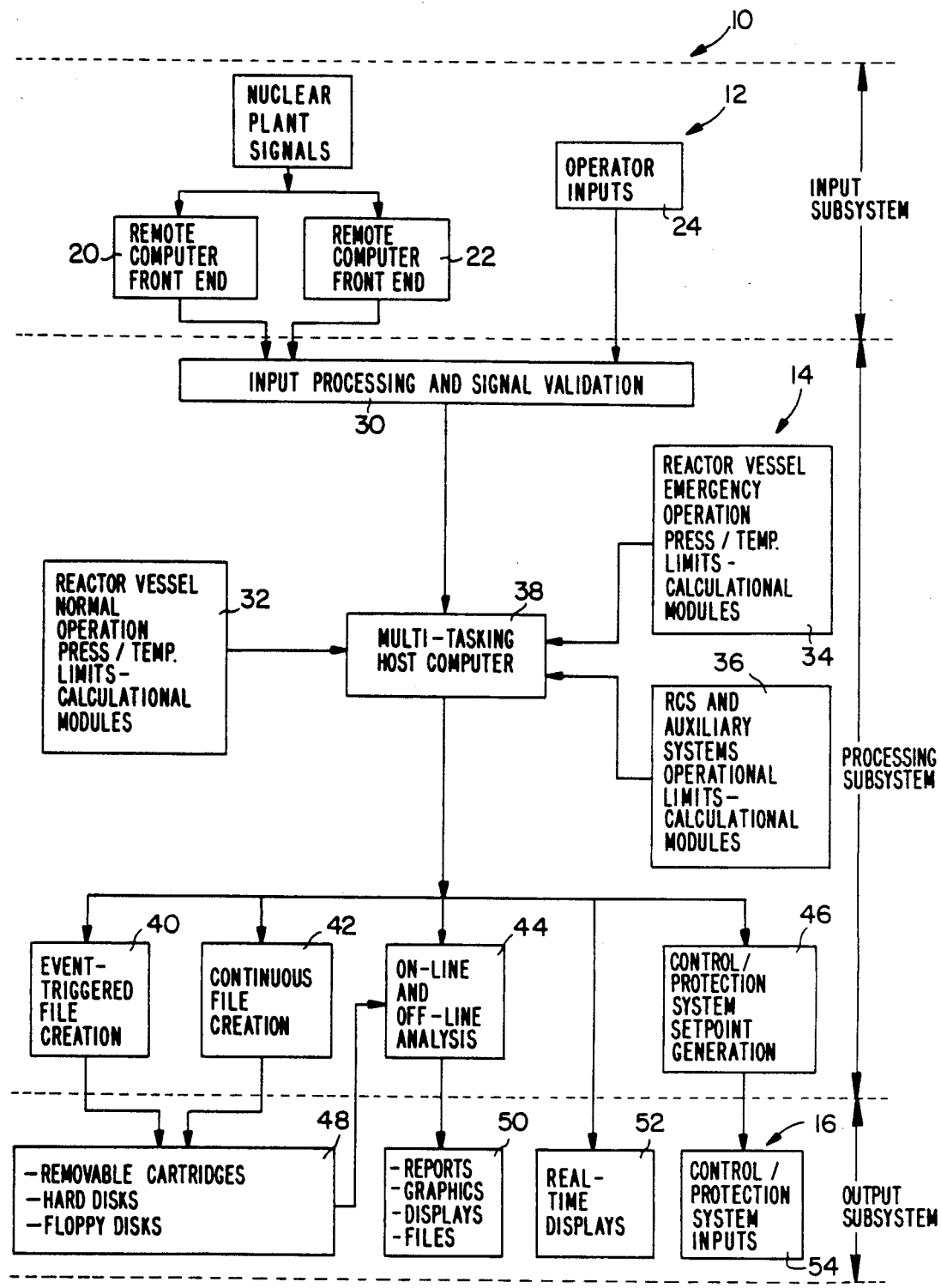

REAL-TIME REACTOR COOLANT SYSTEM PRESSURE/TEMPERATURE LIMIT SYSTEM

TECHNICAL FILED

The present invention relates, in general to a pressure/temperature system for a nuclear reactor coolant system and, more particularly, to a pressure/temperature system that automatically calculates and displays allowable reactor coolant system pressures within the nuclear reactor coolant system.

BACKGROUND ART

The reactor coolant system of a pressurized water reactor must be operated such that the reactor coolant system pressure is maintained below a maximum allowable pressure limit which is based on the fracture properties of the reactor coolant pressure boundary. In addition, the reactor coolant system pressure must be maintained above minimum allowable pressure limits. Presently, control of the reactor coolant pressure is accomplished by developing limit curves of maximum allowable reactor coolant system pressure versus reactor coolant system temperature and then operating the reactor coolant system below the limits shown on the curves. Such limit curves have been developed for both normal reactor coolant system operation and emergency reactor coolant system operation. Typically, these limit curves are developed prior to the plant being placed in operation and are based on conservative operating parameters so that the curves can be applied to all operating conditions. Thus, the curves are typically based on worst-case reactor coolant system material properties, worst-case temperature transients that the reactor coolant system might experience, worst-case reactor coolant pump combinations, reactor coolant density, reactor coolant flow and heat transfer coefficients. By using the worst-case approach, the resulting curves are very conservative and severely limit the operating conditions of the reactor coolant system.

Because of the foregoing, it has become desirable to develop a pressure/temperature system for a nuclear reactor coolant system that is based on actual operating plant conditions rather than worst-case conditions.

SUMMARY OF THE INVENTION

The present invention solves the problems associated with the prior art and other problems by providing a nuclear reactor coolant pressure/temperature system based on actual operating conditions of the nuclear reactor coolant system rather than worst-case conditions to which the reactor coolant system might be subjected. In this manner, the range of pressure-temperature operating conditions available to a nuclear plant operator is increased without jeopardizing the operation of the nuclear reactor. The foregoing is accomplished by utilizing an input subsystem, a processing subsystem and an output subsystem. The input subsystem receives and performs initial processing of real-time plant analog and digital signals, plant operator inputs, and performs various diagnostics and record keeping functions. The inputs are then transmitted to the processing subsystem which develops real-time, reactor coolant system pressure/temperature limits. This real-time, pressure/temperature information is then transmitted to the output subsystem for display purposes and for recording the results of the process. The plant operator display includes the actual reactor coolant system pressure/temperature limits, the time projection of the limits and the necessary information to insure the validity of the time projection and a display of the actual plant operating conditions existing at any point in time.

BRIEF DESCRIPTION OF THE DRAWING

The single FIGURE of the drawing is a schematic diagram of the present invention.

DESCRIPTION OF THE PREFERRED EMBODIMENT

Referring now to the drawings where the illustrations are for the purpose of describing the preferred embodiment of the present invention and are not intended to limit the invention hereto, the single figure of the drawing is a schematic drawing of the pressure/temperature system 10 of the present invention This system 10 is comprised of an input subsystem, shown generally by the numeral 12; a processing subsystem, shown generally by the numeral 14; and an output subsystem, shown generally by the numeral 16.

The input subsystem 12 includes sampling and multiplexing units 20 and 22 and one or more operator consoles 24. Various analog and digital signals developed within a nuclear plant are utilized as inputs to the system 10. These input signals include, but are not limited to, reactor coolant system fluid temperatures, decay heat removal system fluid temperatures, reactor coolant system pressures, reactor coolant pump status, and reactor coolant flow. It is anticipated that the foregoing analog and digital signals will approximate 15 basic reactor coolant system pressure/temperature monitoring inputs 60 heat-up and cool-down inputs, and 10 signal validation inputs. The foregoing signals are applied to the sampling and multiplexing units 20 and 22 which are usually contained in separate instrumentation cabinets These units 20 and 22 include the required input signal connectors, measurement and control modules to process the input signals, a central processing unit for overall data acquisition control, a power supply, and a serial interface port for connection to the host computer. One or more operator consoles 24 are provided to allow the plant operator to manually input data and/or instructions into the system 10.

The processing subsystem 14 includes an input processing and signal validation unit 30, reactor coolant system normal operation pressure/temperature limits calculation modules 32, reactor coolant system emergency operation pressure/temperature limits calculation modules 34, reactor coolant system and auxiliary systems operational limit calculation modules 36, a multi-tasking host computer 38, an event triggered file creation system 40, a continuous file creation system 42, an on-line and off-line analysis system 44, and control/protection system setpoint generation apparatus 46. The function of the input processing and signal validation unit 30 is to access the data acquired by the input subsystem 12 and to perform several types of checks, for example, calculations are made of a best estimate of the input signals, the manual inputs are checked against permissible values, and the data acquisition hardware is tested for validity and over/under range.

The purpose of the present invention is to calculate and display reactor coolant system pressure/temperature limits based on real-time plant inputs. The reactor coolant system normal operation pressure/temperature limits calculation modules 32 represent the software which performs the necessary calculations relative to the normal operating pressure/temperature limits of the reactor coolant system. Similar limits as to pressure and temperature are developed for emergency situations, such as reactor coolant system thermal shock resulting from a small loss of coolant or steam line break. These emergency operation pressure/temperature limits are provided by the software indicated as the reactor coolant system emergency operation pressure/temperature limits calculation modules 34. It should be noted that these emergency limits are on a real-time basis. Individual system limits, such as maximum decay heat system pressure versus reactor coolant system temperature, are also determined on a real-time basis by the software represented as the reactor coolant system and auxiliary systems operational limits calculation modules 36.

The outputs of the input processing and signal validation unit 30, the reactor coolant system normal operation pressure/temperature limits calculation modules 32, the reactor coolant system emergency operation pressure/temperature limits calculation modules 34, and the reactor coolant system and auxiliary systems operational limits calculation modules 36 are utilized as inputs to the multi-tasking host computer 38. This computer 38 uses an operating system that can execute several user defined tasks or application programs simultaneously and is loaded with the necessary peripheral equipment to optimize data acquisition and processing, including multiple interface ports and the power to enable multi-tasking, high speed graphics, and program switching. In this application, fast speed is very desirable because of the need to perform on-line calculations within a strict time schedule. This computer 38 includes concurrent bus architecture, expanded memory, and the processing power needed for the multi-tasking and on-line graphics requirements of the system.

The computer 38 has numerous outputs It can create an event triggered file 40, which is a file designed specifically for a particular event. For example, if the reactor trip parameter approaches its trip value, the creation of a reactor trip transient file will be initiated automatically. The system 10 also routinely logs certain historical data, including inputs and results of its analysis. The computer 38 can create a continuous file with respect to these data, as shown by the numeral 42. The computer 38 can also perform on-line and off-line analysis functions, shown generally by the numeral 44. The application software, that is, the reactor coolant system normal operation pressure/temperature limits calculation modules 32, the reactor coolant system emergency operation pressure/temperature limits calculation modules 34 and the reactor coolant system and auxiliary systems operational limits calculation modules 36, is also available to calculate appropriate control system or protection system setpoints based on real-time plant input. This includes calculations of the required nuclear plant secondary side (steam) pressure setpoint as a function of time to cool the plant down within acceptable limits. It also includes calculation of the reactor coolant system relief valve setpoint as a function of time which would provide low temperature over-pressure protection of the reactor coolant system. The software associated with this control/protection system setpoint generation function is shown generally by the numeral 46.

The output subsystem 16 includes output formats 48; reports, graphics, displays, files, all shown generally by the numeral 50; real-time displays 52; and control/protection system inputs 54. The event triggered file 40 and the continuous file 42 are utilized to produce various output formats 48, such as removable cartridges, hard discs, and floppy discs, all shown generally by the numeral 48. The on-line and off-line analysis function 44 is utilized to produce various reports, graphics, displays, and files, all shown generally by the numeral 50. The multi-tasking host computer 38 can also produce real-time displays, shown generally by the numeral 52. The control/protection system setpoint generation function 46 can produce control/protection system inputs, shown generally by the numeral 54.

Certain modifications and improvements will occur to those skilled in the art upon reading the foregoing. It should be understood that all such modifications and improvements have been deleted herein for the sake of conciseness and readability, but are properly within the scope of the following claims.

I claim:

1. A system, used in controlling the operation of a nuclear reactor coolant system, which automatically calculates and displays allowable reactor coolant system pressure/temperature limits within the nuclear reactor coolant system based upon real-time inputs, comprising:

means for producing signals representative of real-time operating parameters of the nuclear reactor cooling system;

means for developing pressure and temperature limits relating said real-time operating parameters of the nuclear reactor coolant system, for normal and emergency operation thereof;

means for processing said signals representative of real-time operating parameters of the nuclear reactor coolant system to perform calculations of a best estimate of input signals, check manual inputs against permissible values, and test data acquisition hardware for validity and over/under range; and means for comparing said representative signals with said limits for said real-time operating parameters to produce a signal for a real-time display of said pressure and temperature limits and of said real-time operating parameters for use by an operator in controlling the operation of the nuclear reactor coolant system.

2. The system as defined in claim 1 wherein said signal produced by said comparing means is utilized to control the pressure within the nuclear reactor coolant system.

3. The system as defined in claim 1 wherein said signal produced by said comparing means is utilized for on-line and off-line analysis of the operation of the nuclear reactor coolant system.

4. The system as defined in claim 1 wherein said signal produced by said comparing means is utilized to create a record upon the occurrence of a specific event.

5. The system as defined in claim 1 wherein said signal produced by said comparing means is utilized to produce a record of the continuous operation of the nuclear reactor coolant system.

6. The system as defined in claim 1 further including means for manually inputting data and in formation into said processing means.

7. The system as defined in claim 1 wherein said signal produced by said comparing means is utilized to develop control system setpoints.

8. The system as defined in claim 1 wherein said signal produced by said comparing means is utilized to develop protection system setpoints.

9. A system, used by a plant operator in controlling the operation of a nuclear reactor coolant system, which automatically calculates and displays allowable reactor coolant system pressure/temperature limits within the nuclear reactor coolant system based upon real-time inputs, comprising:

an input subsystem having sampling and multiplexing units for receiving real-time input signals developed within a nuclear plant;

a processing subsystem connected to said input subsystem, having reactor coolant system normal operation pressure/temperature limits calculation modules, reactor coolant system emergency operation pressure/temperature limits calculation modules, reactor coolant system and auxiliary systems operational limit calculation modules and a multitasking host computer, for calculating reactor coolant system pressure/temperature limits based upon said real-time input signals, and producing continuous and event triggered data files; and an output subsystem connected to said processing subsystem, having means for producing files of said data in various output formats and means for producing real-time displays of said real-time input signals and said reactor coolant system pressure/temperature limits.

10. The system as defined in claim 9, wherein said processing subsystem further includes means for calculating a required nuclear plant secondary side (steam) pressure setpoint as a function of time to cool the nuclear plant down within acceptable limits.

11. The system as defined in claim 10, wherein said processing subsystem further includes means for calculating a reactor coolant system relief valve setpoint as a function of time which would provide low temperature over-pressure protection of the reactor coolant system.

12. The system as defined in claim 11, wherein said processing subsystem further includes means for determining a maximum decay heat system pressure versus reactor coolant system temperature on the real-time basis.

13. The system as defined in claim 11, wherein said processing subsystem further includes means for performing on-line and of-line analysis functions, based upon said data, to produce various reports, graphics, displays and files.

* * * * *